United States Patent [19]

Bec et al.

[11] Patent Number: 5,617,402
[45] Date of Patent: Apr. 1, 1997

[54] ACCESS AND TRACKING DEVICE FOR AN OPTICAL DISC

[75] Inventors: Daniel Bec, Villaneuve Tolosane; Jean-Pierre Le Merer, Portet Sur Garonne; Michele LeBlanc, Fonsorbes, all of France

[73] Assignee: Art Tech Gigadisc "ATG", Toulouse, France

[21] Appl. No.: 323,504

[22] Filed: Oct. 14, 1994

Related U.S. Application Data

[63] Continuation of Ser. No. 920,432, filed as PCT/FR91/01051, Dec. 20, 1991, abandoned.

[30] Foreign Application Priority Data

Dec. 21, 1990 [FR] France .................................. 90 16135

[51] Int. Cl.$^6$ .............................. G11B 7/09; G11B 7/085; G11B 21/02
[52] U.S. Cl. ........................ 369/219; 369/249; 369/44.14
[58] Field of Search ..................................... 369/215, 219, 369/220, 244, 249, 44.15, 44.16, 44.11, 44.14

[56] References Cited

U.S. PATENT DOCUMENTS

| | | | |
|---|---|---|---|
| 4,399,529 | 8/1983 | Leterme et al. | 369/110 |
| 4,570,249 | 2/1986 | Malissin et al. | 369/45 |
| 4,574,369 | 3/1986 | Koide et al. | 369/44 |
| 4,702,555 | 10/1987 | Iguma et al. | 350/247 |
| 4,773,062 | 9/1988 | Wade et al. | 369/44 |
| 4,864,170 | 9/1989 | Eguchi | 310/12 |
| 4,878,214 | 10/1989 | Hinotani | 369/256 |
| 4,891,799 | 1/1990 | Nakano | 369/45 |
| 4,922,477 | 5/1990 | Miura | 369/221 |
| 4,958,335 | 9/1990 | Takeda | 369/44.14 |

FOREIGN PATENT DOCUMENTS

| | | |
|---|---|---|
| 287235 | 10/1988 | European Pat. Off. . |
| 0326374 | 8/1989 | European Pat. Off. . |
| 379757 | 8/1990 | European Pat. Off. . |
| 58-194147 | 11/1983 | Japan . |
| 62-128031 | 6/1987 | Japan .................................. 369/44.14 |
| 63-224038 | 9/1988 | Japan .................................. 369/219 |
| 237531 | 2/1990 | Japan .................................. 369/244 |

OTHER PUBLICATIONS

Attached is a list of the inventors U.S. applications (1 page).

*Primary Examiner*—Stuart S. Levy
*Assistant Examiner*—William J. Klimowicz
*Attorney, Agent, or Firm*—Roland Plottel

[57] ABSTRACT

The present invention relates to various improvements to a device for access and tracking to a track carried by an information medium, the information being readable and/or recordable optically by a focused radiation, this track forming, on the medium, regularly-spaced or variably spaced revolutions, the revolutions forming a spiral or having the form of concentric circular elements, the device comprising an optical head (1) with optical axis A orthogonal to the plane of the medium, a fixed magnetic circuit comprising at least one core (7) secant to the set of revolutions of the track, in the gap of which two coils (14, 15) move permitting respectively track access and radial tracking to be achieved, as well as focusing of the radiation onto the track, the optical head and the two coils being fixed rigidly to one another in such a way as to form a single compact mobile unit.

According to one improvement, the two coils (14, 15) are set in a symmetric arrangement, the desired movement being obtained by addition of forces (F, F') induced by the currents flowing in the coils.

16 Claims, 6 Drawing Sheets

ACCESS AND TRACKING DEVICE FOR AN OPTICAL DISC

This application is a continuation of application Ser. No. 07/920,432, filed as PCT/FR91/01051, Dec. 20, 1991, now abandoned.

BACKGROUND OF THE INVENTION

The present invention relates to various improvements to the access and tracking device for an optical disc described in French Patent Application No. 89-08800 filed on 30 Jun. 1989 in the name of ART TECH GIGADISC "ATG".

Figure 1:
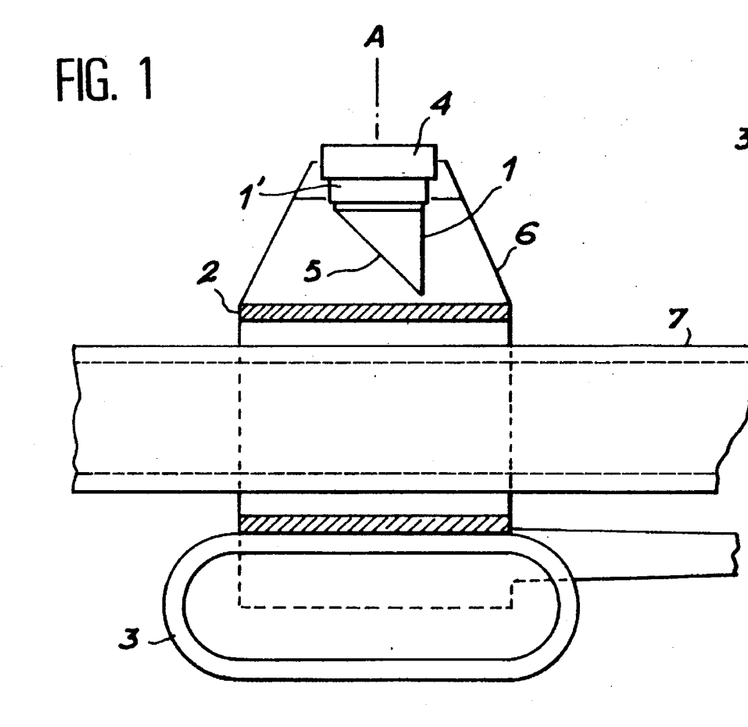
FIG. 1, already described, is a view in longitudinal section of an access and tracking device according to the prior art.

This Patent Application describes a device for access to and tracking of a track on an information medium, the information being readable and/or recordable optically by a focused beam such as an optical disc, which exhibits the lightest and the most compact structure possible. For this reason, the elements of the access and tracking device such as the optical head and the two coils associated with the motor-devices permitting respectively access and radial tracking, as well as focusing, to be achieved are fixed rigidly to one another in such a way as to form a single compact mobile unit moving in the gaps in the magnetic circuits. Hence, as represented in FIG. 1, the access and tracking device described in French Patent No. 89-08800 essentially comprises at least one optical head 1 which will be described in more detail later, a first coil 2 for access and radial tracking and a second coil 3 for focusing. This assembly forms a compact unit. In fact, as represented in FIG. 1, the optical head 1 is constituted more particularly by a cylindrical element 1' carrying, at its upper end, a focusing lens 4 and, at its lower end, a return mirror 5 intended to reflect the beam given off by the laser source towards the optical disc, not shown. The axis A of the head is placed orthogonally to the plane of the disc. This head 1 is fixed on a rigid support element 6 which is integrated with the coil 2. This coil 2 can be moved in translation in the gap of a first fixed magnetic circuit. In order to simplify the drawing, only the central core 7 of the first fixed magnetic circuit has been represented. In a known way, this core 7 is secant to all the grooves or revolutions of the optical disc and extends over a length equal to at least the useful recording length augmented by the length of the mobile unit. This first magnetic circuit, in association with the coil 2, thus forms the first motor device permitting access and tracking of the track. Moreover, as represented in FIG. 1, below the coil 2 is fixed, by means of a fixing system such as brackets or rigid elements, not shown, a coil 3 used for focusing. This coil 3 can be moved in the gap of a second magnetic circuit, not shown in FIG. 1, which, in association with the coil 3, forms the second motor device permitting focusing. Moreover, as shown in FIG. 1, the mobile unit comprises an anti-pitching device 8 which consists, in the embodiment represented, of a slide 9 into which can slide a stem 10 fixed at one end to the mobile unit and bearing at its other end specific anti-pitching means whose shape corresponds to the shape of the slide 9.

Figure 2:
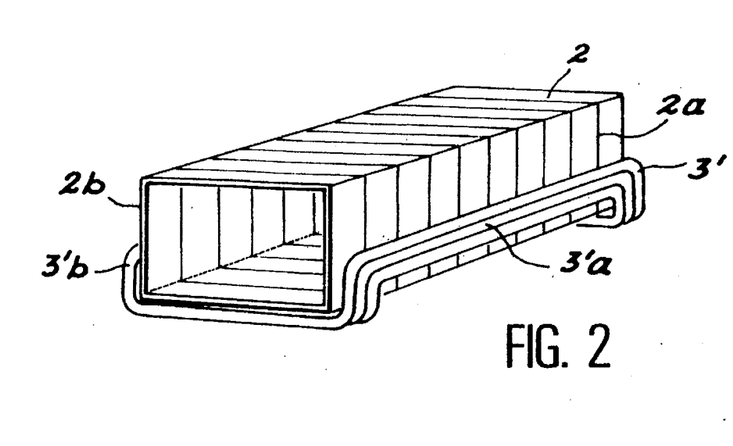
FIG. 2, already described, is a simplified perspective view of an embodiment of the coils used in the access and tracking device of FIG. 1.

As shown in FIGS. 1 or 2, the coil 2 may be constituted by a cylindrical frame with axis parallel to a radius of the disc onto which is wound at least one conductor whose turns are oriented, in their active part, along the optical axis of the head. In the embodiment represented in FIG. 1, the coil 3 is constituted by a flat coil of substantially elliptical shape. This coil comprises conductors oriented perpendicularly to the optical axis A of the optical head 1.

In order to simplify the mobile unit and render it more compact, French Patent Application No. 89-08800 also proposes a solution using only a single magnetic circuit to produce the two access and radial tracking as well as focusing devices. In this case, an access and radial tracking coil 2 is used, as well as a focusing coil 3' such as those represented in FIG. 2. The coil 2 is substantially identical to the coil 2 of FIG. 1. In this case, the coil 2 is a self-supporting coil obtained by cylindrically winding a conductor, the rigidity of the coil being provided solely by the bonding of the various turns. However, the coil 2 could also be produced by winding on a cylindrical former. The sides 2a and 2b represent the active parts of the conductor or of the conductors of the coil 2. The coil 3 is then constituted by a flat coil bent into a U in such a way as to be fitted under the access coil 2. In this case, the parts 3'a and 3'b are the active portions of the conductor or of the conductors of the coil 3'.

With the coils described above, only one magnetic circuit is in operation. However, this type of coil exhibits a certain number of drawbacks. The bonding of the two coils is difficult to produce. Moreover, as the lower coil is fixed to the coil 2 only by a film of adhesive, resonance phenomena are observed. Furthermore, in order to keep these resonances to a sufficiently-high frequency, aluminium wires have to be used, which are more problematic in use than copper wires.

SUMMARY OF THE INVENTION

The aim of the present invention is to alleviate these drawbacks by proposing a first improvement to the access and tracking device for an optical disc described in French Patent Application No. 89-08800, more particularly an improvement to the way in which the coils are produced.

Consequently, an object of the present invention is a device for access to and tracking of a track carried by an information medium, the information being readable and/or recordable optically by a focused beam, this track forming, on the medium, regularly-spaced or variably spaced revolutions, the revolutions forming a spiral or exhibiting the form of concentric circular elements, said device comprising an optical head with optical axis orthogonal to the plane of said medium, a fixed magnetic circuit comprising at least one core secant to the set of revolutions of the track, in the gap of which two coils move permitting respectively track access and radial tracking to be achieved, as well as focusing of the beam onto the track, the optical head and the two coils being fixed rigidly to one another in such a way as to form a single compact mobile unit, characterised in that the two coils are set in a symmetric arrangement, the desired movement being obtained by addition of forces induced by the currents flowing in the coils.

According to a preferential embodiment, the active conductors of the two coils are mutually perpendicular and form an angle of 45° with respect to the optical axis. For that reason, the coils which are placed in the same magnetic field experience mutually perpendicular forces, but in directions at 45° with respect to the previous coils. These coils permit operation in a single gap like the coils represented in FIG. 2, but they are produced with flat turns which facilitate their construction. One of these coils is powered by the sum of two currents, the other by the difference in these two same currents. One of the currents belongs to the radial tracking servo control loop, the other to the focusing servo control loop.

Furthermore, according to another characteristic, the conductors of the two coils are wound on a hollow cylindrical former in such a way as to move on the core of the magnetic circuit. For that reason, the conductors are wound rigidly on the former, which avoids resonances which are detrimental to the tracking and gives better transmission of the forces from the conductors to the useful mass, namely the optical head. According to another advantage of this embodiment, copper conductors can be used, as the coils are no longer self-supporting.

Another object of the present invention is also to propose a second improvement to the device for access and tracking to an optical disc described in French Patent Application No. 89-08800 which makes it possible to render the mobile unit even more compact.

Consequently, the subject of the present invention is also a device for access to and tracking of a track carried by an information medium, the information being readable and/or recordable optically by a focused radiation, this track forming, on the medium, regularly-spaced or variably spaced revolutions, the revolutions forming a spiral or exhibiting the form of concentric circular elements, said device comprising an optical head with optical axis orthogonal to the plane of said medium, at least one fixed magnetic circuit comprising at least one core secant to the set of revolutions of the track, in the gap of which two coils move permitting respectively access and radial tracking to be achieved, as well as focusing of the radiation onto the track, the optical head and the two coils being fixed rigidly to one another in such a way as to form a single compact mobile unit, characterised in that the central core is produced in such a way as to permit the passage of at least a part of the optical head, the coils being wound around the core in such a way as to leave a passage for the said head.

According to a preferential embodiment, the central core is equipped with a groove receiving at least a part of the optical head.

An other object of the present invention is to provide a third improvement to the device for access to and tracking of an optical disc described in French Patent Application No. 89-08800 which permits better radial tracking and better positioning of the optical head to be achieved.

Consequently, the access to and tracking device is characterised in that the compact unit is fixed to a guidance device by means with two degrees of freedom.

According to a first embodiment, the means with two degrees of freedom are constituted by at least one vertical elastic strip fixed to the compact unit and by at least one horizontal elastic strip linking the first strip to the guidance device.

According to another embodiment, the means with two degrees of freedom are constituted by at least one vertical elastic strip fixed, on the one hand to the compact unit and, on the other hand, to a guidance stem as well as by the guidance stem. The elastic strip supplies radial elasticity; the stem permits, as in the Patent Application 89-08800, an oscillating movement in the focusing direction.

Needless to say the words "horizontal" and "vertical" have been employed with the assumption that the optical disc is itself in a horizontal position. The person skilled in the art will have no difficulty in transposing them if the disc occupies a different orientation in space.

These embodiments make it possible to produce a guidance device guided in friction exhibiting a mass which is very much less than that of the head in such a way that the parasitic oscillations of the guidance device during its movement, especially its operating jerks, have little effect on the optical head.

This fixing with two degrees of flexibility is suitable for an access and tracking device moved by coils at 45° with respect to the optical axis as well as for a device moved by conventional coils as described in Patent Application No. 89-08800.

Other characteristics and advantages of the present invention will appear on reading the description of various embodiments, given below with reference to the attached drawings in which:

DESCRIPTION OF PREFERRED EMBODIMENTS

In order to simplify the description, the same elements bear the same references in the figures.

Figure 3:
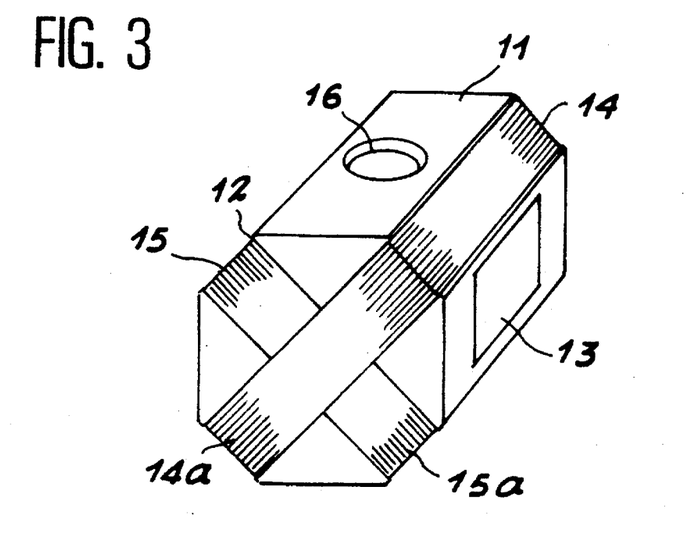
FIG. 3 is a perspective view of an embodiment of the coils in accordance with the present invention, this embodiment capable of being used in an access and tracking device of the type such as that represented in FIG. 1.
Figure 4:
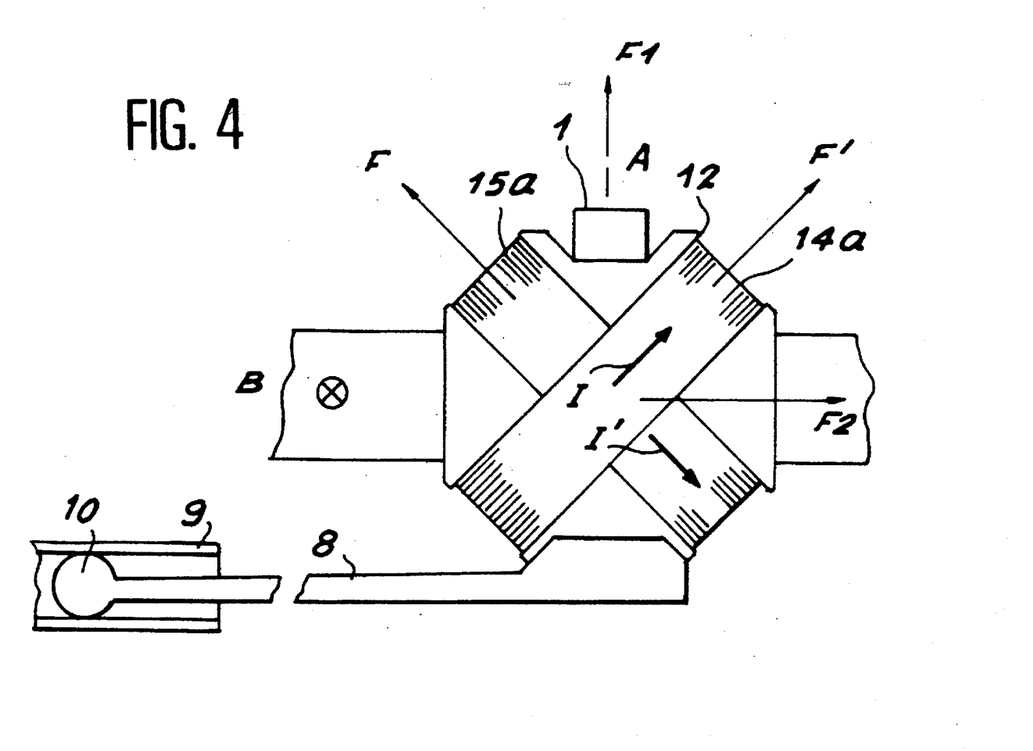
FIG. 4 is a simplified sectional view of an access and tracking device in accordance with the present invention using the coils of FIG. 3.

FIGS. 3 and 4 represent another embodiment of the coils used for the motor device carrying out access and radial tracking as well as for the motor device carrying out focusing. As represented more particularly in FIG. 3, the two coils 14 and 15 are produced on a cylindrically shaped form or former 11. Preferably, this former exhibits, in cross section, the shape of an eight-sided polygon. Four sides of the polygon are equipped with regularly distributed recesses 12 in such a way that two recesses 12 are diagonally opposed.

The two coils 14 and 15 are obtained by winding wires produced for example in copper around the former, passing through the recesses 12 as represented in FIGS. 3 and 4. For this reason, the coils exhibit a symmetric arrangement, the active conductors 14a, 15a of the two coils being mutually perpendicular and forming an angle of 45° with respect to the optical axis A. Moreover, as represented in FIGS. 3 and 4, the former exhibits, in two of its non-recessed faces, apertures 13 permitting the passage of the central core 7 of the magnetic circuit and of the optical beam. Furthermore, an aperture 16 is provided on one face perpendicular to the faces containing the apertures 13. This aperture 16 enables the optical head to be housed, as will be described later.

With the arrangement described above, the coils 14 and 15 which are placed in the same magnetic field B experience mutually-perpendicular forces, but in directions at 45° with respect to the coils described in Patent Application No. 89-08800. Hence, as represented in FIG. 4, if the coil 14 is carrying a current I, due to the magnetic field B perpendicular to the plane of the figure, the assembly will experience a force F along the direction represented in FIG. 4. Similarly, if the coil 15 is carrying a current I', the assembly will experience a force F'. By vector addition of the two forces F and F' the force causing the movement of the compact mobile unit constituted by the coils 14, 15 and the optical head 1 is thus obtained, which makes it possible to obtain control of the head for the purposes of focusing as well as for access and radial tracking. In fact, as represented in FIG. 4, the projection of the sum of the forces F and F' along the direction of the optical axis is a force $F_1$ permitting the focusing movement whereas the projection of this same sum in a radial direction is a force $F_2$ permitting access and radial tracking movement.

The arrangement described above therefore makes it possible to obtain all the movements necessary for the mobile unit. It also exhibits the advantages described below. The wires of the coils 14 and 15 are held firmly in the recesses 12 in the former; this increases the rigidity of the assembly and avoids resonance phenomena which are detrimental to the controlling performance characteristics. This also gives better transmission of the forces from the active conductors 14a, 15a to the useful mass, namely the optical head: focusing objective lens and return mirror for the beam. Moreover, with this arrangement, it is possible to use copper wires whereas the arrangement described with reference to FIG. 2 was produced with aluminium wires which are more problematic in use. A supplementary advantage of the arrangement described above resides in the fact that the conductors are more easily housed in the gap in the magnetic circuit, as the wires are more ordered. The guidance system is identical to that shown in FIG. 1.

Figure 5A:
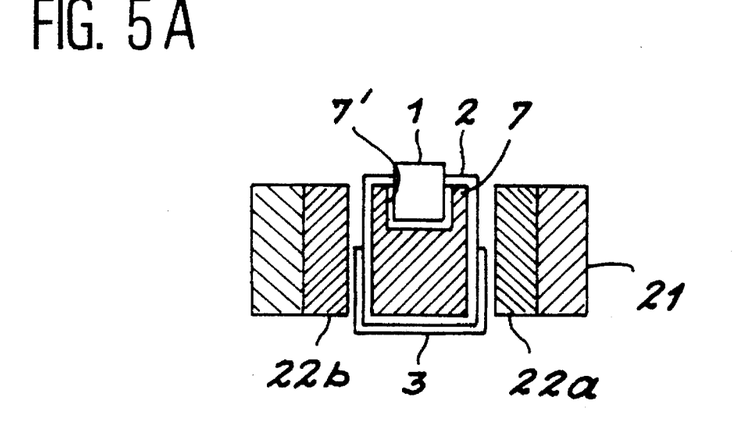
FIGS. 5A and 5B are respectively a sectional view and a perspective view representing one embodiment variant of the access and tracking device represented in FIGS. 1 and 2.
Figure 5B:
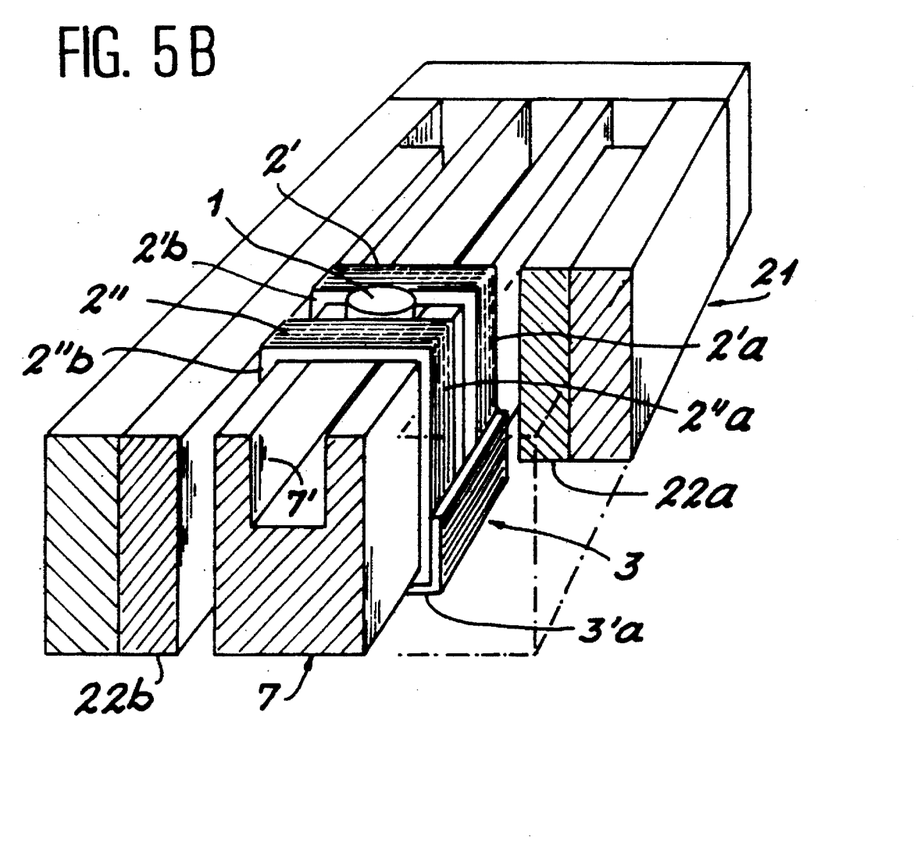

An embodiment of the central core 7, making it possible to obtain both a mobile unit and a magnetic circuit which are more compact than those of the prior art, will now be described. In this case, as represented in FIGS. 5A and 5B, the central core 7 of the magnetic circuit is equipped with a recess 7' into which at least a part of the optical head 1 is housed. In order to compensate for this loss of cross-section of the central core, its height is slightly increased, without changing its width; the height of the coil 2 is slightly increased but the centre of gravity of the compact mobile unit is found to be brought closer to the centre of application of the forces which limits its parasitic undulation movements. In order to permit the optical head to be at least partially housed in the soft-iron core, the coil 2 is produced in the form of two coils 2' and 2". The useful current layers are then 2'a, 2'b, 2"a, 2"b. The rest of the magnetic circuit comprises, in a known way, a yoke 21 and two magnets 22a and 22b. This solution exhibits the advantage of having both a more compact magnetic circuit and a more compact mobile unit.

Moreover, the embodiments of FIGS. 5A, and 5B have been described by referring to an arrangement of coils of the type such as that described with reference to FIG. 2. However, it is obvious to the person skilled in the art that the structure of the central core can also be used with an arrangement of coils such as that described with reference to FIGS. 3 and 4 without departing from the scope of the present invention.

Figure 6A:
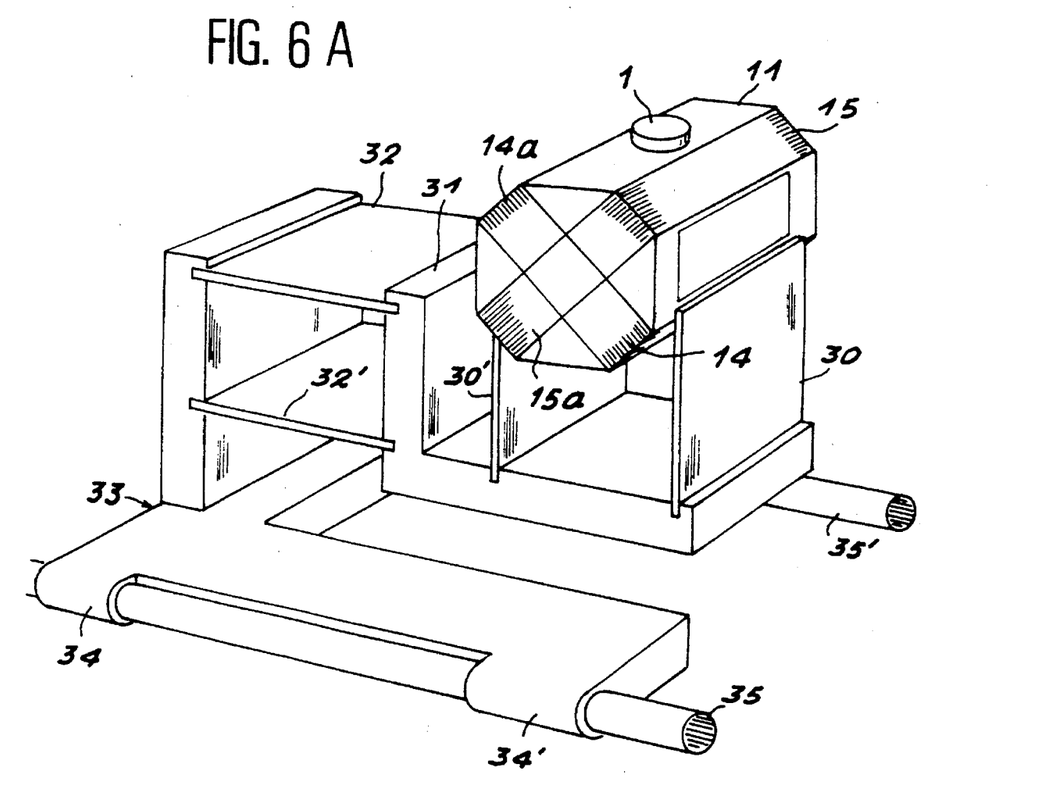
FIG. 6A is a diagrammatic perspective view representing another embodiment variant of an access and tracking device according to the invention.
Figure 6B:
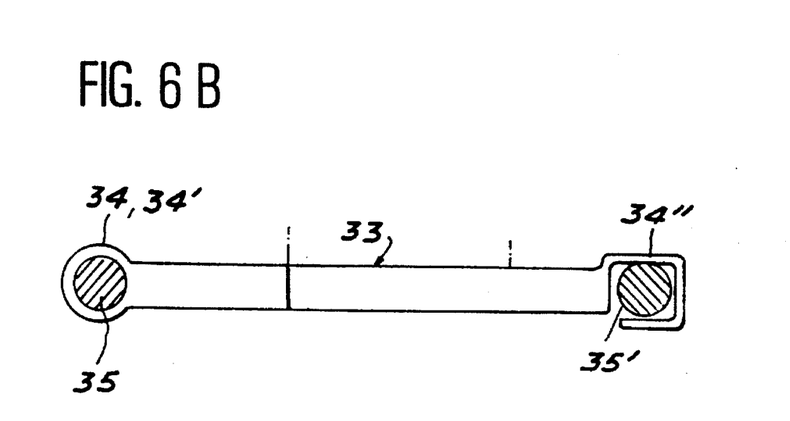
FIG. 6B is an enlarged end view of the guidance device for the access and tracking device according to the invention.

With reference to FIG. 6A, there will now be described a mode of fixing the mobile unit constituted by the optical head 1 and the former 11 on which the coils 14 and 15 are wound to a guidance device 33 capable of moving radially with respect to the set of revolutions of the track of the information medium such as an optical disc. For that reason, the guidance device 33 is, for example, constituted by a flat element fitted with collars 34, 34' and with a support 34" capable of moving on two parallel guides 35, 35'. In accordance with the present invention, the mobile unit is fixed by the intermediary of two vertical elastic strips 30, 30' on a bracket 31, which is itself fixed by two horizontal elastic strips 32, 32', to the guidance device 33. With this arrangement, and by producing a guidance device 33 of very low mass, exhibiting, for example, a mass less than ⅕ of the mass of the assembly of the mobile unit, the jerks of the guidance device which is guided dry-sliding on the guides 35 and 35', have little effect on the former 11 and the optical head 1.

Figure 7A:
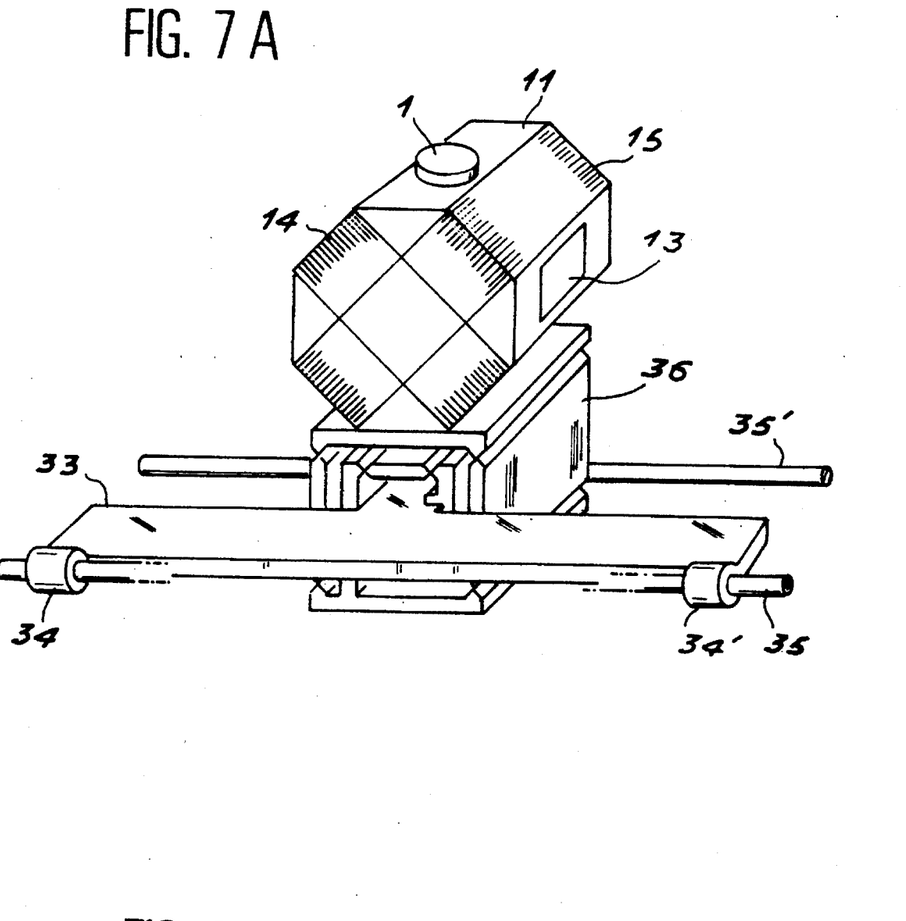
FIG. 7A is a diagrammatic perspective view representing a third embodiment variant of an access and tracking device in accordance with the invention.

Another embodiment of the two pairs of elastic strips shown in FIG. 7A, makes it possible to produce this assembly of strips in the form of a single part 36 made in moulded plastic. The access and tracking device using this part 36 is, moreover, similar to that shown in FIG. 6A; in order to show this similarity the same references as those of FIG. 6A have been used for FIG. 7A.

Figure 7B:
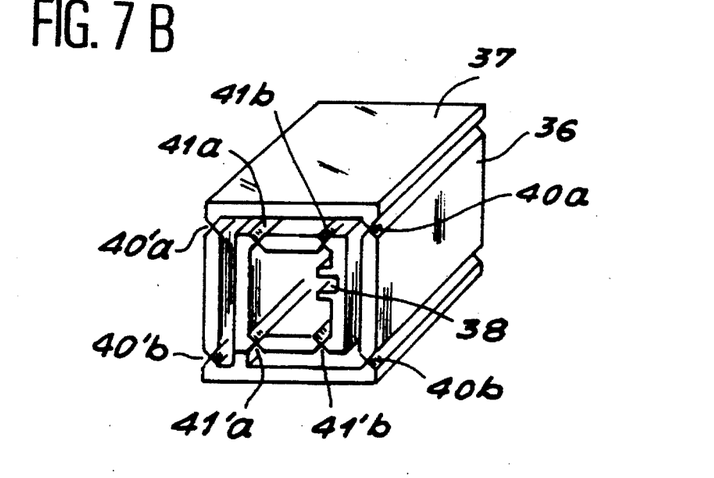
FIG. 7B is a view in perspective of the system with two degrees of freedom used in the access and tracking device represented in FIG. 7A.

The single part 36 is linked rigidly to the former 11. This link is effected, for example, by bonding the lower face of the former 11 to the upper face 37 of the part 36. The body of the guidance device 33 is bonded into the rib 38 of the part 36. As represented in FIG. 7B, the part 36 is composed of rigid parallel strips linked together by lines of lesser strength, obtained by locally greatly reducing the thickness of the parallel strips. The lines 41a and 41b on the one hand and 41'a and 41'b on the other hand provide flexibility in the vertical direction, the focusing direction. The lines 40a and 40b on the one hand and 40'a and 40'b on the other hand provide flexibility in a horizontal direction, the access and radial teacking direction. This embodiment permits very easy fabrication and use of the block of strips.

Figure 8:
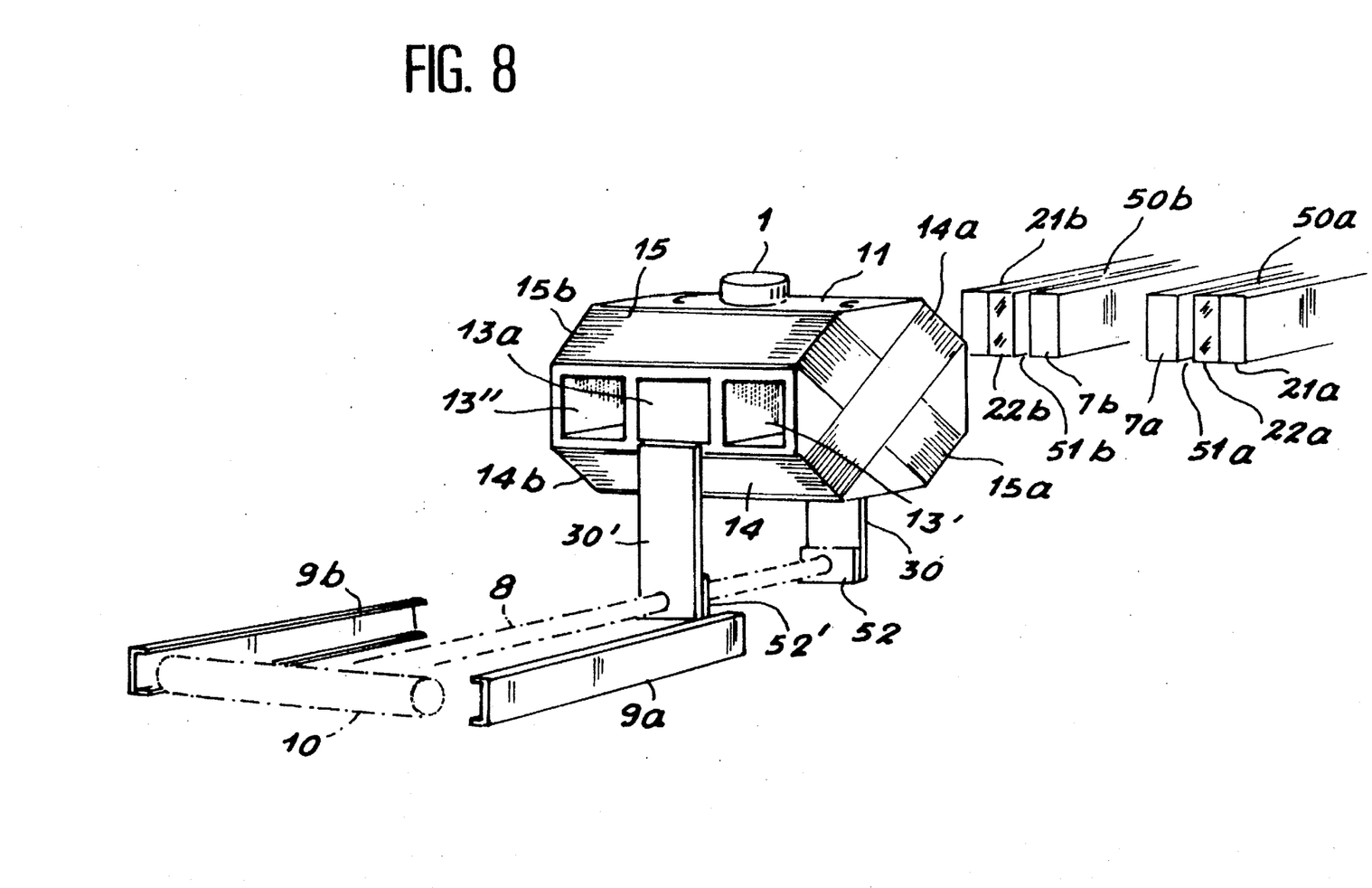
FIG. 8 is a diagrammatic perspective view representing a fourth embodiment variant of a tracking and access device in accordance with the invention.

A fourth variant of the access device, represented in FIG. 8, uses, in order to provide two degrees of freedom, on the one hand, two vertical strips 30 and 30' providing flexibility in the access and radial tracking direction and, on the other hand, an oscillating stem 8 in the shape of a T, providing movement in the focusing direction by virtue of rotation, having as its axis the generatrix of the stem 10 which is in contact with the edges of the U-shaped slides 9a and 9b. For greater clarity, this figure is represented exploded; the compact mobile unit is separated from the fixed parts, namely: the magnetic circuit 50a and 50b and the guidance slides 9a and 9b.

In FIG. 8 the magnetic circuit represented is double: it comprises a first magnetic circuit 50a composed of a core 7a, of a magnet 22a and of a yoke 21a and a second magnetic circuit 50b composed of a core 7b, of a magnet 22b and a yoke 21b.

Magnetic induction in the gap 51a of the magnetic circuit 50a interacts with the layers of wires 14a and 15a belonging respectively to coils 14 and 15. Magnetic induction in the gap 51b of the magnetic circuit 50b interacts with the layers of wires 14b and 15b belonging respectively to coils 14 and 15.

In the former 11 of the mobile unit three recesses are formed. Recess 13a permits the passage of the light beam before it reaches the return mirror then the objective lens of the optical head during its outward path, or after it has passed through the lens and is reflected on the return mirror during its return path.

The recess 13' permits the passage of the core 7a. Its side walls have a spacing such that the core 7a slides therein with slight friction. Its height is, in contrast, sufficiently greater than that of the core 7a so as to permit the focusing movements necessary for the compact mobile unit. The recess 13" permits passage of the core 7b. Its relationships with the core 7b are the same as those of the recess 13' with respect to the core 7a. This slight friction of the cores 7a and 7b respectively in the recesses 13' and 13", associated with the slight friction of the ends of the stem 10 at the bottom of the slides 9a and 9b makes it possible to keep the parasitic yaw movements of the mobile compact unit to an acceptable level. The slight friction of the cylindrical surface of the stem 10 against the two branches of each of the two slides in the shape of a U 9a and 9b makes it possible to keep the parasitic roll movements of the compact mobile unit to an acceptable level. As for the pitching movement, it is a useful movement: it is the focusing movement.

The fixing of the flexible strips 30 and 30' onto the stem 8 is carried out with the aid of two doubler plates 52 and 52' which are rigidly fixed to the stem 8 so as to permit the strips 30 and 30' to be embedded into the stem 8. This embedding is not obligatory and simple bonding of the strips 30 and 30' onto the stem 8, without doubling plates 52 and 52' would be the equivalent of an articulation and would permit the height of the strips 30 and 30' to be reduced. At their other end, the strips are fixed onto the former 11, either rigidly (embedding), or flexibly (articulation).

It is obvious to the person skilled in the art that each of these types of fixing with two degrees of freedom can be used with all the compact mobile units as described in French Patent Application No. 89-08800 or in French Patent No. 2,522,860.

We claim:

1. A device for access to a track carried by an information medium having at least a recorded face, the information being readable and/or recordable optically by radiation focussed onto said recorded face by a lens having an optical axis, said track forming revolutions on the medium which form a spiral or concentric circular elements, said device comprising:

a fixed magnetic circuit comprising a central core having a longitudinal axis secant to the whole set of revolutions of said track, said magnetic circuit having two airgaps flanking said central core, each of said airgaps having an outer magnetic pole piece, an optical head comprising said lens and on a side of said lens opposite to said information medium, a mirror for causing radiation incident on said mirror to deviate from the direction along said longitudinal axis to a direction along the optical axis of the lens, said mirror being rigidly fixed to said lens, an image of said optical axis reflected by said mirror being directed along said longitudinal axis, coil means wound around said central core for creating an electrodynamic force on said optical head along said longitudinal axis, permitting said optical head to access the revolutions of said track, said coil means and said optical head forming a monolithic assembly, and said image of said optical axis lying inside a coil of said coil means, means for displacing said optical head along said optical axis of the lens.

2. A device according to claim 1, wherein said central core comprises a single U-shaped core which has a recess forming a housing for a bottom portion of said optical head, said recess extending along said longitudinal axis and having a constant cross-section.

3. A device according to claim 1 or 2, wherein said means for displacing comprises a moving coil.

4. A device according to claim 3, wherein portions of said moving coil are located within said airgaps.

5. A device according to claim 4, wherein said moving coil is a coil which is partially wrapped around said central core.

6. A device according to claim 3, wherein said moving coil is a coil which is partially wrapped around said central core.

7. A device according to claim 1 or 2, wherein said coil means comprises two coils respectively, located on each side of said optical head such as to form a single compact mobile unit.

8. A device according to claim 7, wherein said two coils cooperate with the magnetic field in said airgaps for producing electrodynamic forces in the direction of said optical axis.

9. A device according to claim 7, wherein said two coils are set in a symmetric arrangement and cooperate with the magnetic field in said airgaps for creating further electrodynamic forces, the vector addition of which has a direction selected in a group including the direction of the optical axis and the direction of said longitudinal axis.

10. A device according to claim 9, wherein said two coils are wound in a coil form having openings for the passage of said central core and a further opening for the passage of the optical head.

11. A device according to claim 10, wherein said coil form has an octagonal cross-section, and two pairs of diagonally opposed lateral sides of said coil form are provided with recesses to house said two coils, the portions of said two coils lying in said airgaps being mutually perpendicular and at an angle of 45° in relation to said optical axis.

12. A device according to any one of the claims 10, comprising fixed guidance means, and wherein said optical head is attached to an intermediate carriage slidably mounted on said fixed guidance means, said intermediate carriage having orienting means for keeping said optical axis substantially aligned in a direction perpendicular to the information medium.

13. A device according to claim 12, wherein said orienting means comprise two mechanical systems respectively allowing simple translatory movement in distinct directions contained in a plan defined by said optical axis and said longitudinal axis.

14. A device according to claim 13, wherein said two mechanical systems each comprise at least one elastic strip.

15. A device according to claim 13, wherein the two mechanical systems each comprise at least one rigid strip with two lines of lesser strength.

16. A device according to claim 13, wherein said two mechanical systems comprise at least one rigid strip linked to an oscillating stem.

* * * * *